United States Patent [19]
Rylander

[11] Patent Number: 5,917,486
[45] Date of Patent: Jun. 29, 1999

[54] SYSTEM AND METHOD FOR CLIENT PROGRAM CONTROL OF A COMPUTER DISPLAY CURSOR

[75] Inventor: John E. Rylander, Rochester, Minn.

[73] Assignee: Prolexia Reading Education Software Corporation, Rochester, Minn.

[21] Appl. No.: 08/963,331

[22] Filed: Nov. 3, 1997

Related U.S. Application Data

[60] Provisional application No. 60/030,023, Nov. 4, 1996.

[51] Int. Cl.$^6$ .............................. G06F 3/14; G06F 3/033
[52] U.S. Cl. ........................ 345/339; 345/157; 345/145; 345/348
[58] Field of Search ..................................... 345/145, 157, 345/160, 339, 347, 336, 338, 964, 977, 348

[56] References Cited

U.S. PATENT DOCUMENTS

| | | | |
|---|---|---|---|
| 4,686,522 | 8/1987 | Hernandez et al. | 345/160 |
| 4,725,829 | 2/1988 | Murphy | 345/145 |
| 5,307,457 | 4/1994 | Beitel et al. | 345/348 |
| 5,583,984 | 12/1996 | Conrad et al. | 345/340 |
| 5,617,117 | 4/1997 | Kataoka et al. | 345/157 |
| 5,745,715 | 4/1998 | Pickover et al. | 345/348 |

*Primary Examiner*—Raymond J. Bayerl
*Assistant Examiner*—Cuong T. Thai
*Attorney, Agent, or Firm*—Paul W. O'Malley

[57] ABSTRACT

A cursor positioning system for a data processing system having a user interface shell defining positions for user entry of commands and data, a hot spot associated with a position in the user interface shell and a hot spot positioning device is disclosed. The cursor positioning provides for initially imaging a cursor in association with the hot spot and after computer prompted entry into a graphical operation mode by the user, detaching the displayed cursor from the hot spot. The hot spot position thereafter resets to a base position after every movement of the hot spot positioning device. The displayed cursor is moved to a series of successive locations in response to user manipulation of the hot spot positioning device, starting from the then current locations of the cursor with each move. Net displacement of the cursor in response to hot spot movement may be made extremely fine and mouse speed setting limitations in default device drivers supplied with popular desktop computer operating system products thereby overcome. Cursor speed may also be conveniently set for several users.

16 Claims, 5 Drawing Sheets

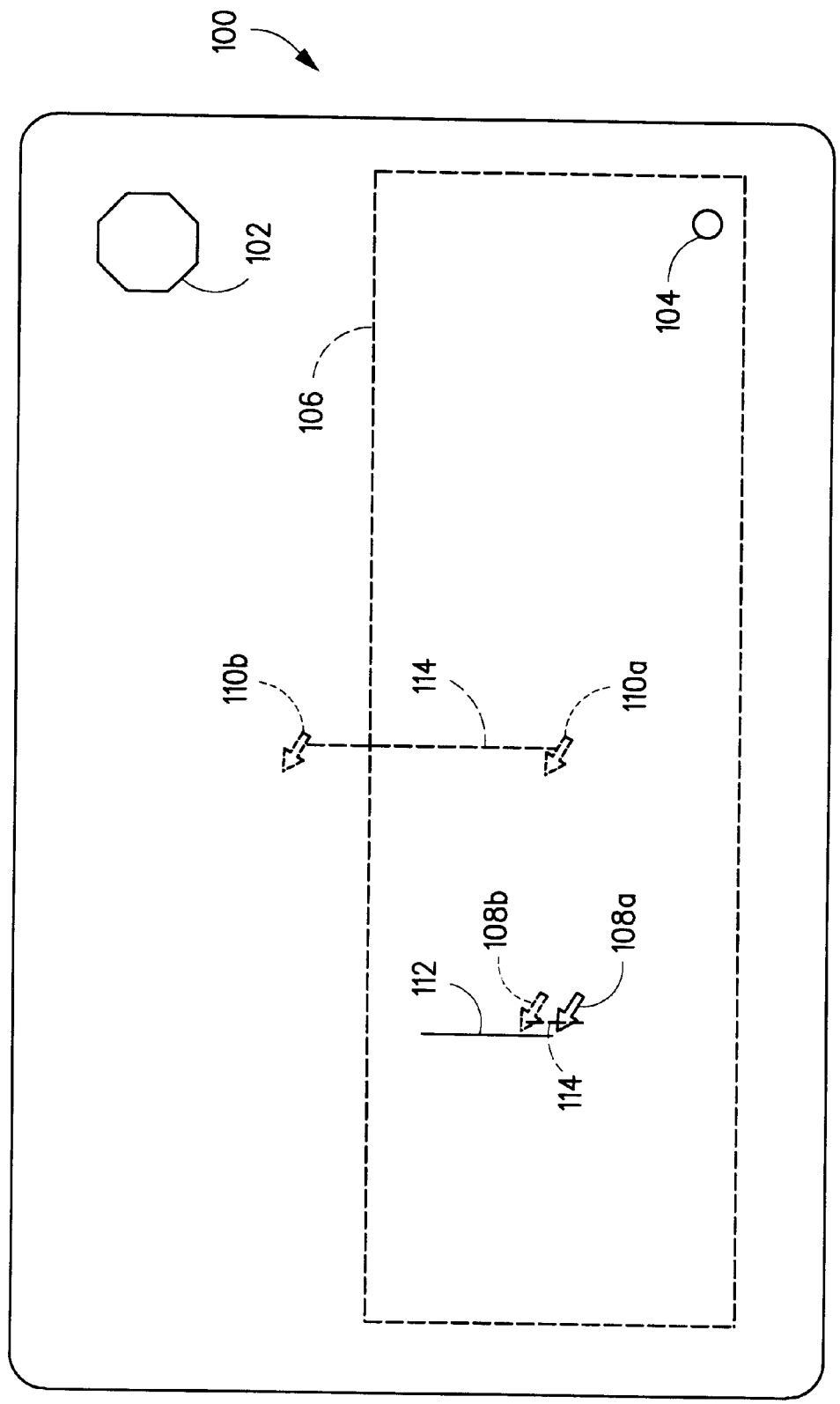

SYSTEM AND METHOD FOR CLIENT PROGRAM CONTROL OF A COMPUTER DISPLAY CURSOR

This application is related to the provisional application of John E. Rylander and Arlene W. Sonday serial number 60/030,023 filed Nov. 4, 1996 pending.

BACKGROUND OF THE INVENTION

1. Field of the Invention

The present invention relates to computer input/output interfaces and more particularly to providing application program control of the display cursor through a mouse or trackball.

2. Description of the Problem

The computer mouse or puck and its associated display pointer (usually termed "cursor" when associated with Microsoft Corp. operating system shells) has become along with the computer keyboard one of the two default methods of user interaction with personal computers in systems employing a graphical user interface (GUI) shell. Examples of popular GUI shells include those used with the Apple MacOS operating system, the Workplace Shell of the IBM OS/2 operating system, and most recently, the Microsoft Windows 95 shell. To the computer user, a GUI is generally characterized by the display on a computer display device of graphical icons representing programs, data files or other operational elements of the system, which may "selected" or "activated" by moving a display pointer or cursor to the icon and "clicking" a mouse button one or more times while the cursor icon is collocated with the functional icons. In general the replacement of earlier command line interfaces, characterized by teletype like, line by line entry of cryptic commands with GUIs has accommodated the transfer to the user of the power to move seemingly seamlessly between application programs. GUIs present a number of problems for shell design, many resulting from the relaxation of the strict temporal sequence of events forced on users by a command interpreter using command line interface shell.

A shell functions as a user command interpreter and as an output device. Use of a GUI shell as a command interpreter was made possible in large part by cursor-addressable display screens, where the locations of individual pixels on the screen has input significance for the computer system. Cursors, which are associated with a "hot spot", a pixel of current input significance, are displayed to the user as a sort of floating icon. The user moves the icon, and its associated hot spot, by manipulation of a coordinate input device, such as the arrow keys on a computer keyboard, a light pen, a joy stick, or most commonly, the mouse. An operation is initiated by clicking, or potentially by simply allowing the cursor icon to linger over a target icon. The target is identified by coincidence in the coordinates of the cursor hot spot and the coordinates of the target icon (which will embrace several pixels).

Because programmers can assume that a mouse is attached to the vast majority of personal computers, it is natural to allow their use as data input devices for application programs, particularly graphically oriented programs such as cad programs or games. Hence a mouse may be used to draw a line in a cad program or to change the apparent orientation of the user in a two or three dimensional environment of a game program. Many application programs utilize the cursor in an analogous fashion to the use of the cursor in the base operating system shell, which is to activate certain functions when a user "presses" a special purpose icon called a control button. In a game environment, coordinate information from the mouse is used but the cursor maybe suppressed. In application programs where the cursor remains displayed, programmers generally accept the default operating system defined movement of the cursor in response to user movement of the mouse.

Some operating system environments, particularly that provided by the Microsoft Windows 95 product, limit user control over cursor behavior to setting "mouse speed". The default behavior of the cursor in response to user inputs using a mouse are controlled by the mouse and display device drivers. In Windows 95, user modification of mouse/cursor behavior is done through a "MouseSpeed" setting. Taken as a literal description of what is occurring, the term "MouseSpeed" is imprecise. By default, Windows 95 provides only three modifications on basic linear cursor movement. The slowest rate is called the basic cursor rate. The second speed provided doubles the basic cursor rate. The third speed provided quadruples the basic cursor rate. Additional speed settings are obtained by defining threshold mouse movement rates where the doubling and quadrupling of the basic cursor rate occur. At setting 0 the basic cursor rate is always used. At setting 1 the basic cursor rate is doubled if the mouse is moved faster than a first minimum rate. At setting 2 the basic cursor rate is doubled if the mouse is moved faster than the first minimum rate and quadrupled if moved faster than a second, higher threshold. At setting 3 the minimum threshold speeds of mouse movement for doubling and quadrupling cursor speed occur at lower minimums. The process is repeated for each successive higher setting of "mouse speed".

Some users can benefit by providing far slower cursor responsiveness to mouse movement than that provided by the Windows 95 default mouse device driver. While finer control of cursor responsiveness to mouse movement could be achieved by replacing the mouse device driver, such a change would effect all applications and the GUI shell. What is needed is a non operating system specific way of changing cursor behavior for specific application programs without modifying the operating system environment. Preferably, such functionality should be operating system independent and tolerant of operating systems with default mouse device drivers having limited functionality, such as that of Windows 95.

SUMMARY OF THE INVENTION

It is an object of the present invention to provide client program control over cursor movement on a personal computer system.

It is a further object of the invention to provide client program control over cursor speed without modifying the underlying operating system environment of the personal computer system.

It is still another object of the present invention to provide a slow motion data entry point for the entry of graphical constructs.

It is yet another object of the inventor to provide automatic and transparent adjustment of cursor behavior in response to particular mouse activities.

The present invention provides a method and a system for providing client program control of cursor movement in response to use of a mouse, trackball, or other cursor positioning device. Contemporary data processing systems typically display data to users using a video display. When coupled with a graphical user interface, the video display provides a cursor and is used to make entries contingent on cursor position on the display. In broadest overview, the invention provides program control over cursor positioning, particularly the apparent speed of cursor movement responsive to user movement of the mouse, puck or trackball. The method of the present invention may be extended to any cursor positioning device, such as light pens, joysticks, or the IBM TrackPoint pointing device. However, the invention is advantageously employed with pedagogical handwriting analysis systems to slow cursor responsiveness to user movement of a mouse, thereby allowing or requiring the user to make relatively large arm movements in constructing letters.

In brief, a combination of application program initiation and user inputs causes the application program to suppress the original cursor and generate a new one using program supplied parameters for controlling positioning of the cursor. Conventionally, the active position of the cursor is associated with a hot spot having a position defined in terms of a single pixel. The hot spot may be moved from position to position using the mouse or track hall. In implementing the invention the data processing system first defines a subregion with positionally defined borders in the video display. Then, responsive to user movement of the hot spot into the subregion, the cursor is hidden and a secondary cursor icon is displayed in its place at the position of the hot spot. Next, the position of the hot spot is saved and the hot spot is moved to a base position. Responsive to further manipulation of the input device, a movement vector of the hot spot from the base position is calculated. Using a scaled version of the movement vector, the cursor icon is repositioned from its current location to a new location. The cursor icon may be moved to a number of successive locations, always repositioning the hot spot to its base position after each move. In graphical applications, the successive locations of the cursor may be connected by lines.

BRIEF DESCRIPTION OF THE DRAWINGS

FIG. 4 is a screen display illustrating operation of the present invention as perceived by a user of a personal computer when implemented on a personal computer.

DETAILED DESCRIPTION OF THE INVENTION

Figure 1:
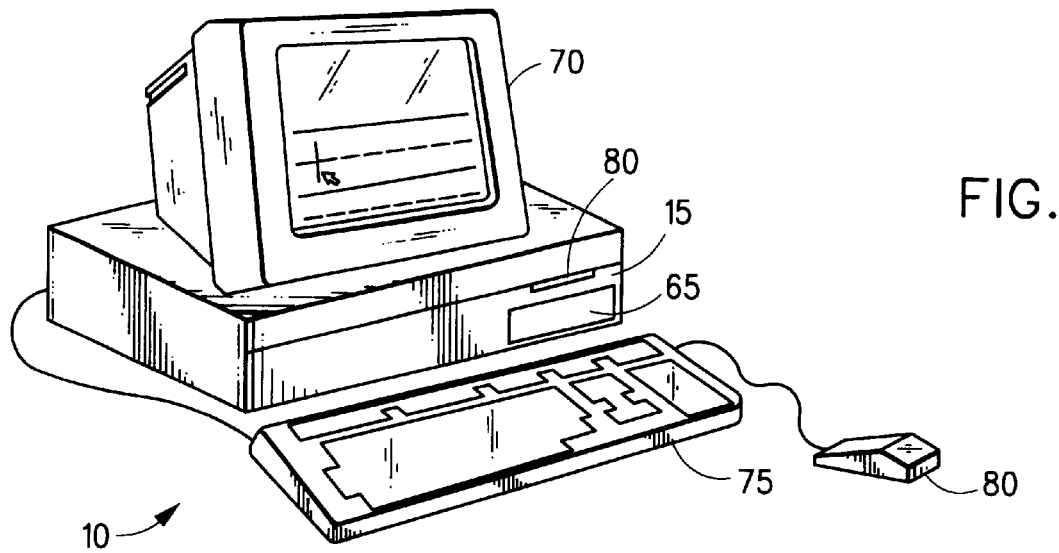
FIG. 1 is a perspective view of a personal computer suitable for use in implementing the present invention.
Figure 2:
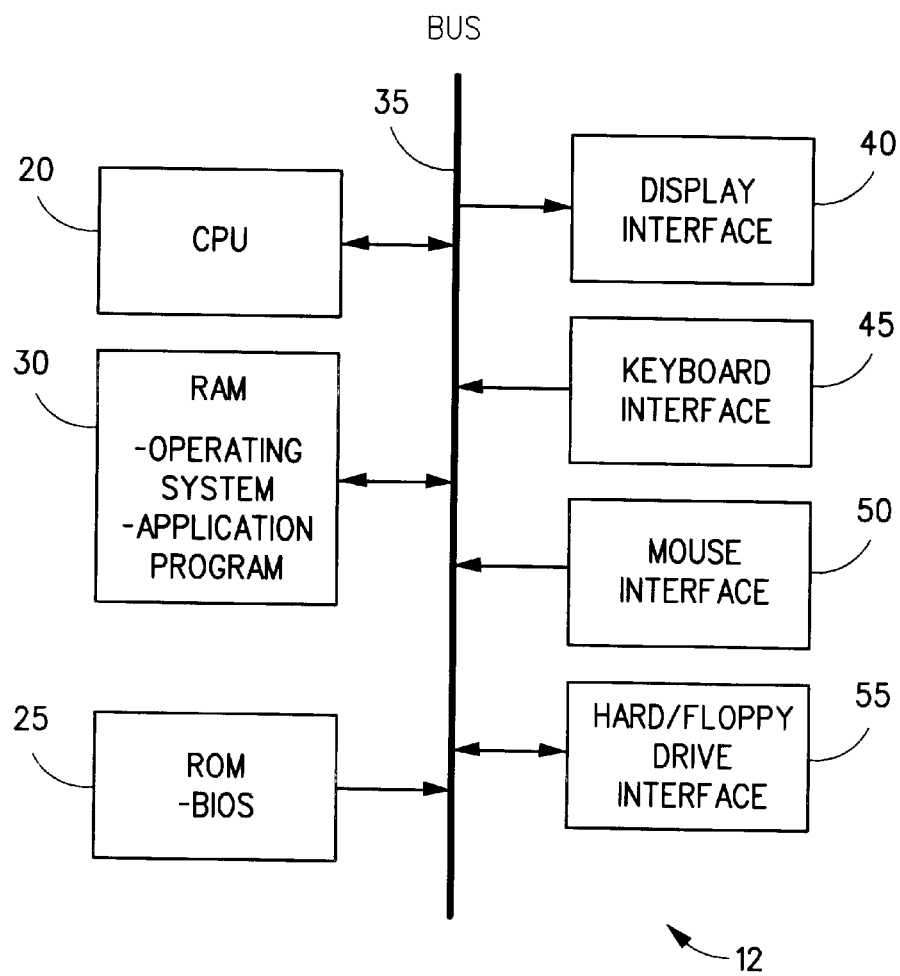
FIG. 2 is a block diagram showing the principal functional components of a personal computer.

FIG. 1 illustrates an IBM compatible personal computer 10 suitable for implementing the present invention. Computer 10 includes a plurality of drives 60, 65, mounted in chassis 15 and physically connected to a computer motherboard or functionally comparable structure (representationally depicted in FIG. 2) through a drive interface 55 (FIG. 2). The drives 60, 65 may include one or more of the following peripheral devices, a floppy drive, a hard drive, a CD-ROM drive, or a tape drive. Drives 60, 65 provide non-volatile storage of data and programs on magnetic or optical media from which the computer 10 may read and to which it can, in most cases, write data. The personal computer 10 may display various data and defines areas for the user input of data on a display 70 by imaging a graphical user interface (GUI) shell or graphical program interface on the display. A user enters commands and other information using keyboard 75 or, of particular interest here, a pointing device such as a mouse 80 or puck. Alternatively, the pointing device could be a track ball or other device.

The detailed description which follows is represented in a largely symbolic and algorithmic fashion commonly understood by programmers of personal computers. An algorithm is generally to be taken as a sequence of computer executed steps producing a particular result. The steps involve changing the states of various physical devices represented in FIG. 2. The motherboard 12 of the computer 10 is typically a large circuit board supporting most, or even all of the non mechanical data handling components of the computer. Computer 10 may in rare cases be constructed using an active or passive backplane and dependent functional cards, however, the representation of the system architecture embodied in motherboard 12 would not substantially change. Motherboard 12 provides transfer of data, address information and commands between read only memory (ROM) 25, system memory (random access memory-RAM) 30, a central processing unit (CPU) 20, a display interface or graphics board 40, a keyboard interface 45, a mouse or pointing device interface 50 and a drive interface 55 over a system bus 35. Data, programs and the operating system are permanently stored on drives 60, 65 and are transferred across the system bus 35 from the drive interface 55 to RAM 30 when the computer is in use. When computer 10 is turned on, or reset, major components of the operating system are transferred from drives 60, 65 to RAM 30 resulting in CPU 20 executing system code to display visual elements of the graphical user interface of the operating system to displayed through display interface 40. Similarly, when an application program is started by a user or the system portions of the relevant code for the application program may be transferred from drives 60, 65 to RAM 30. The operating system typically will include device drivers for devices attached to the computer, including such peripheral devices as the mouse 80.

The preferred embodiment of the invention is adapted to operate with the Microsoft "Windows 95" operating environment which comprises several application program interfaces (API), an operating system with default device drivers and a graphical user interface shell. Conceptually the invention may also be used with the Windows NT operating system, one of several versions of the Dos operating system especially where combined with a GUI shell such as the Windows 3.x shell, or the IBM OS/2 operating system, among others. These systems contemplate user use of a mouse 80 or similar pointing device to select and manipulate objects in the system GUI shell as well as in opened applications. Also, these systems allow the mouse 80 to be used to draw lines or figures, particularly in application programs. In any of the above operating environments the operating system moves, in response to user inputs though the mouse 80, a small bitmapped icon called a cursor or pointer on the display. The mouse pointer has a single-pixel hot spot that corresponds to a precise set of coordinates on the display 70 which are meaningful to the computer system 10.

Figure 3:
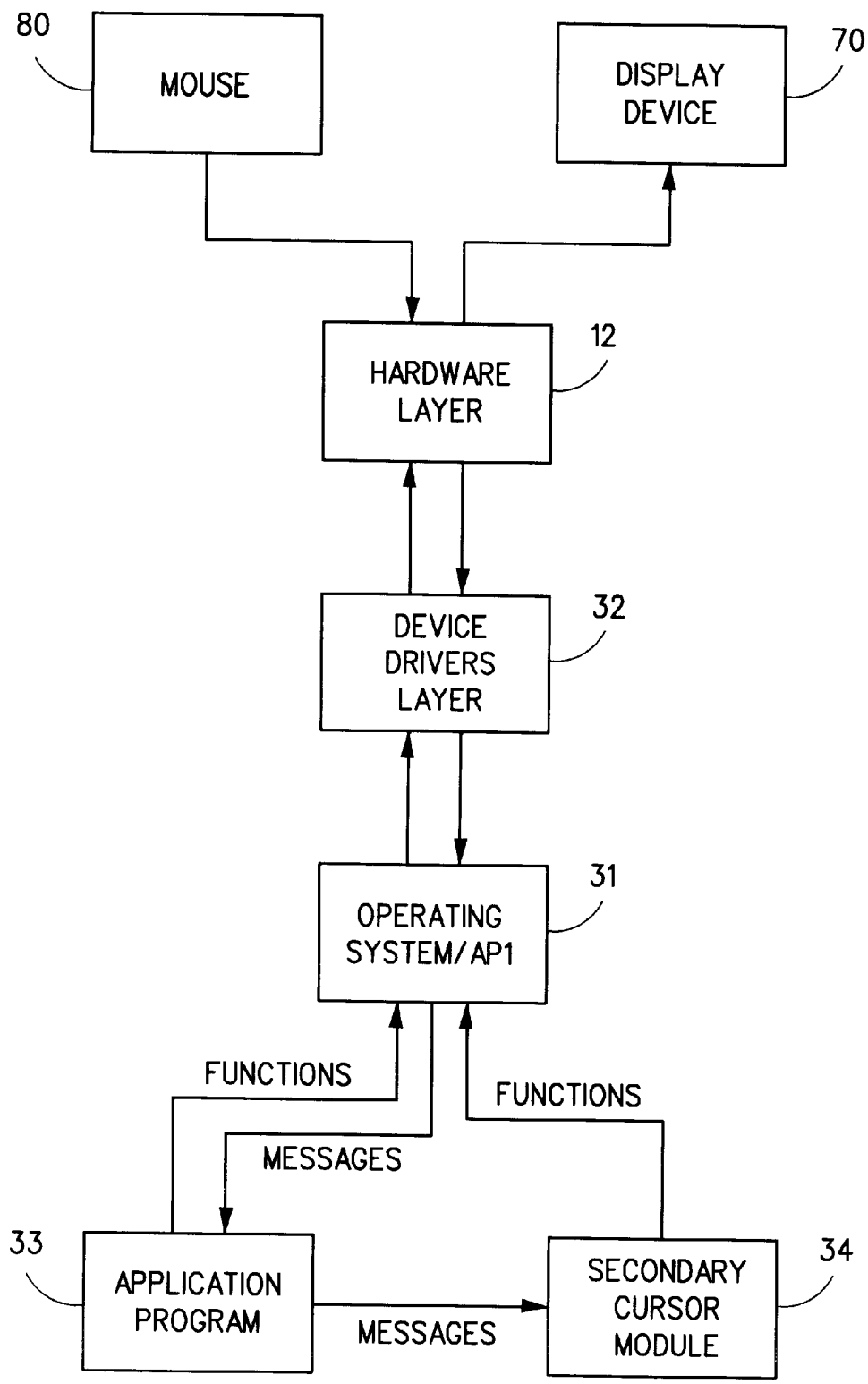
FIG. 3 is a block diagram illustrating the data and instruction flow between major software and hardware objects in a personal computer.

Referring to FIG. 3, Windows 95 utilizes device drivers layer 32 to control input and output on various devices such as a mouse 80 and display device 70. Device drivers are generally accessed by an application program 33 through the operating system 31 by the mechanism of system calls. As discussed above, in the Windows 95 operating environment display cursor movement is corresponds to and is a scaled multiplication of mouse speed. The scaling function uses mouse speed as the input variable (strictly speaking the input variable is the number of pixels moved between mouse generated interrupts) and has three parameter categories: (1) the basic cursor movement rate; (2) basic rate multipliers; and (3) minimum thresholds for application of the basic rate multipliers. The second and third parameters are user selected through a "MouseSpeed" setting accessible from the CUI shell. For example, at MouseSpeed setting 0, Windows 95 always uses the basic mouse rate for cursor movement. At MouseSpeed 1 setting, Windows 95 will move the pointer at twice the basic rate if you move the mouse fast enough, i.e. faster than a first threshold value in terms of pixels per interrupt. At MouseSpeed 2 a second threshold is set past which cursor speed is quadrupled. At higher MouseSpeed settings the threshold levels are progressively reduced to simulate for the user a sense of a highly motion sensitive mouse 80 by the combined response of the mouse and video device drivers of device drivers layer 32.

The invention provides control of cursor speed through a secondary cursor module 34 which, in the preferred embodiment, is part of the application program 33. The invention provides a novel context responsive mode of operation of the display cursor and additionally provides a way of overcoming limitations of the Windows 95 default operating environment without modifying the device drivers layer 32. Operating system/API 31 conventionally receives function and system calls from the application program 33 and from routines which are part of the application program. The invention is implemented by generating system calls in response to certain program contextual information received by the application program 33 in messages from the operating system 31.

Referring to FIG. 4, a screen display 100 illustrates an operational overview of the present invention. Screen display 100 is generated by application program 33 in a full screen session. Control buttons 102, 104 are conventional cursor actuated GUI controls actuated when the mouse/cursor are in the conventional or, what I term, navigational mode of cursor operation. Under certain operating conditions, described more fully below, a secondary cursor 108A is imaged on screen display 100 within a graphical entry area 106. Secondary cursor 108A has motion characteristics responsive to mouse 80 movement events which are defined by secondary cursor module 34. The motion characteristics may be made user dependent. In the preferred embodiment, the motion characteristics are selected to enhance kinesthetic training of the user by requiring over large movement of the mouse to produce relatively small changes in secondary cursor 108A position a track of which may be displayed on display 70. Put another way, secondary cursor 108A movement can be made extremely fine.

In one application of the invention, secondary cursor 108A indicates the entry point for extensions of a stroke 112 tracing the motion of a mouse being used to construct a letter or figure on screen display 100. As illustrated, a user adds to the stroke 112 by movement of secondary cursor 108A from its former position at 108B in the direction of arrow 114. The change in position of the secondary cursor 108A from former secondary cursor 108B reflects the change in position of mouse 80 between two mouse generated interrupts, although the displacement is greatly reduced relative to mouse 80 movement. As illustrated, all displacements are greatly exaggerated for the sake of clarity. Video and mouse device drivers in device drivers layer 32 generate primary cursors 110A, 10B, reflecting the basic cursor rate scaled movement of the primary cursor mouse, or more exactly, the cursor hot spot, between mouse interrupts. The movement is downward along double arrow 114 from a base position reflected by primary cursor 110B to a new position reflected by primary cursor 110A.

Display of the primary cursors 110A, 110B is suppressed by a system call from secondary cursor module 34 to the operating system 31. The position of secondary cursor 108A is determined by finding the vector defined by the change in position of the primary cursors on arrow 114 and using the vector as an input into a secondary cursor position calculation. Primary cursor 110A is reset after each mouse movement event to a base position, represented by primary cursor 110B. In other words, after each mouse movement event a new primary cursor position is calculated and immediately discarded by resetting the position, after determining a movement vector, to the position where the primary cursor started. The base position is preferably, but not necessarily, located at the center coordinates of display device 70. (This permits, e.g., substantially slower secondary cursor movement anywhere on the display device without the faster primary cursor prematurely reaching an edge and rendering further primary or secondary cursor movement in that direction impossible.) Since the primary cursor has been hidden, the user sees only the secondary cursor 108A which appears to be the cursor location for graphical work. The replacement of the cursor occurs automatically and transparently to the user.

Figure 5A:
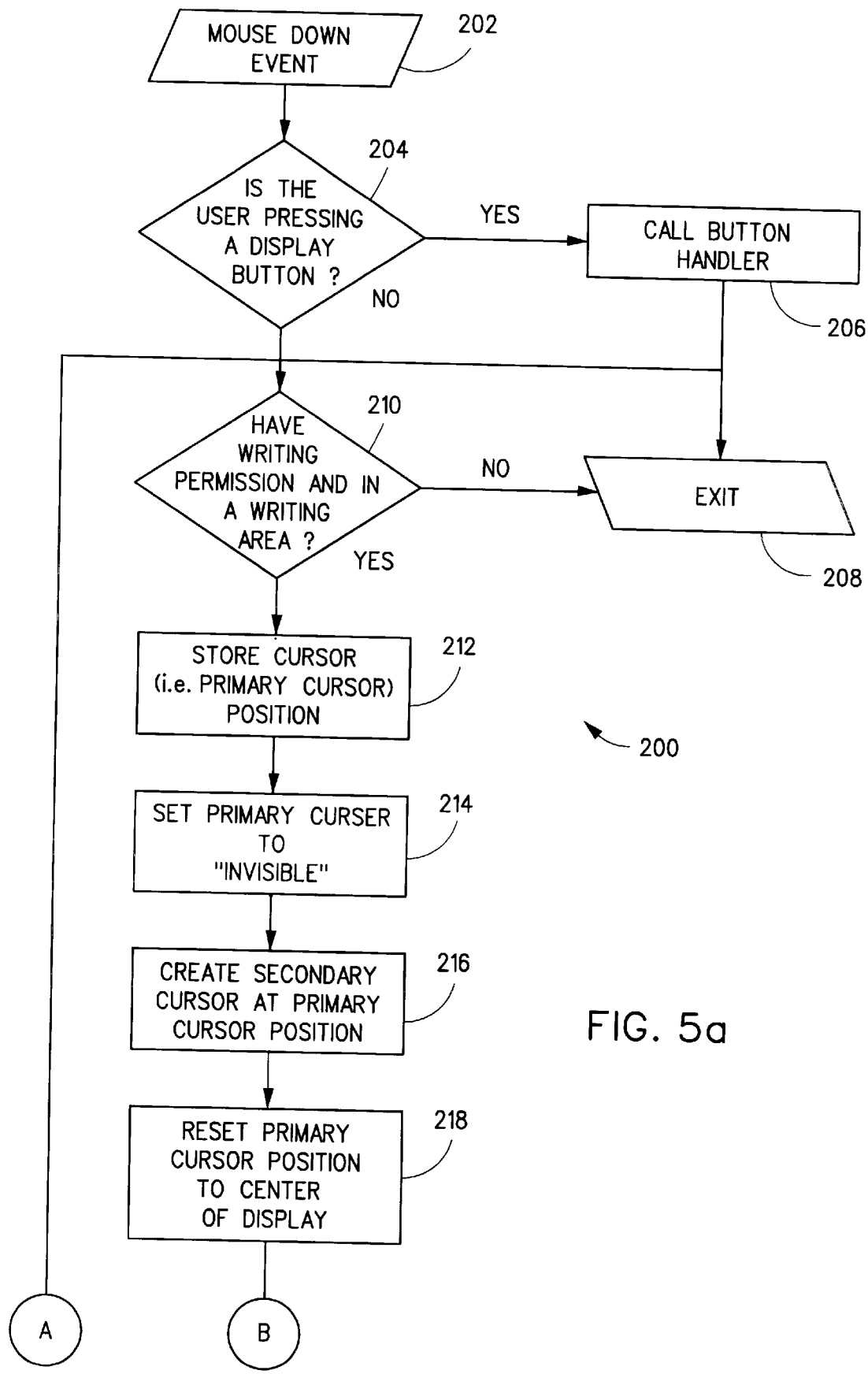
FIG. 5 is a flow diagram illustrating the method of the present invention as implemented by an application program running on a personal computer.
Figure 5B:
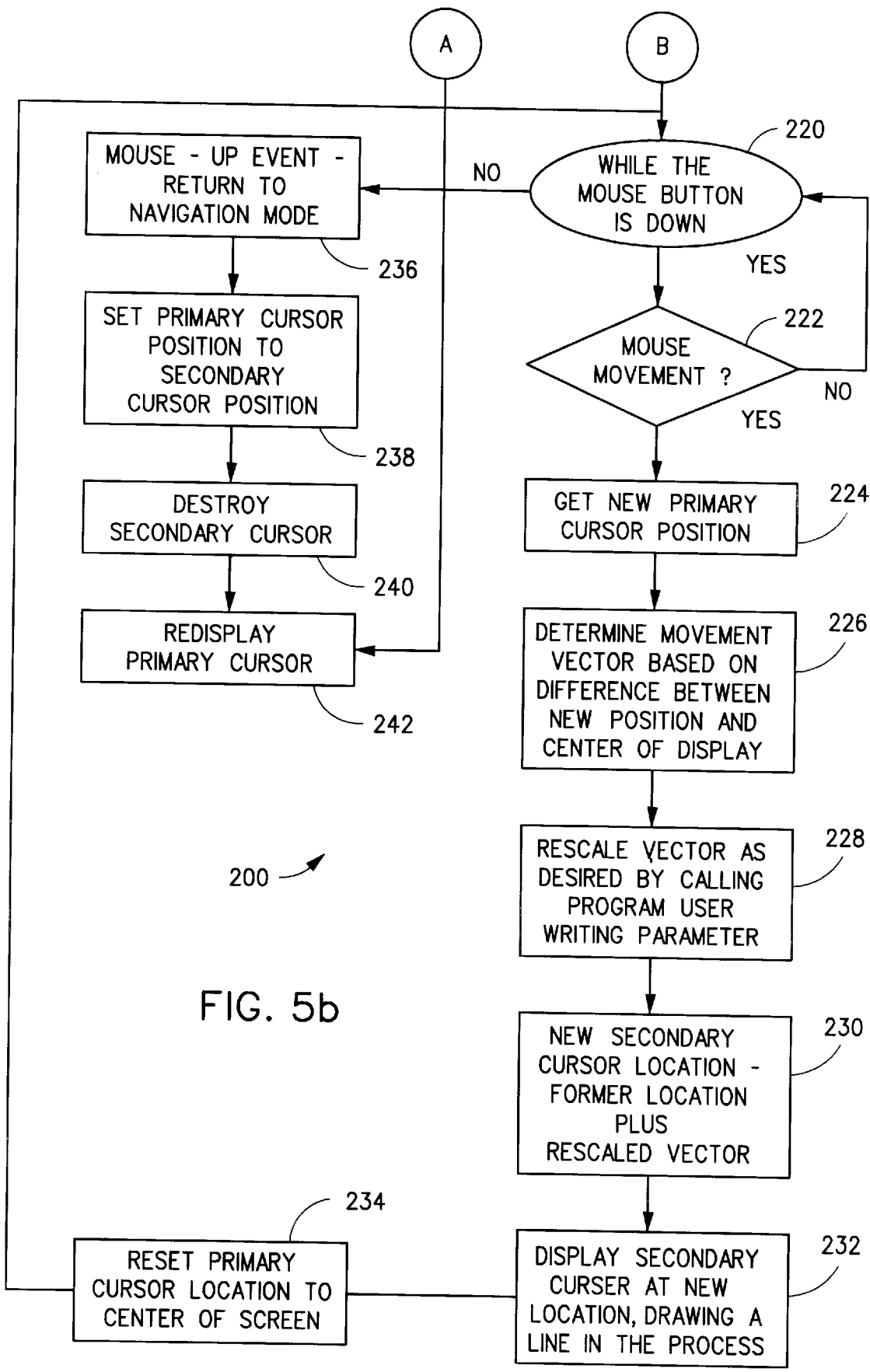

FIG. 5 is a flow chart illustrating application program level steps for seamlessly producing a secondary cursor 108A. In the preferred embodiment, the secondary cursor module 34 provides for fine graphics control in a kinesthetic training program and defines the point of entry for additions to a stroke being constructed by a user. Transition to and from fine control of the cursor as a data entry point for the construction of letters is automatic and transparent to the user. In the preferred Windows 95 API environment overcoming the limitations of the default mouse device driver is done as illustrated below. Those skilled in the art will realize that in operating system environments providing more flexible mouse control the application program may issue commands to the mouse driver temporarily resealing its speed. Program 200 includes the secondary cursor module 34 and also provides for transparent and automatic return to what is termed navigation mode, i.e. normal mouse operation, whenever the user attempts to use the mouse conventionally, e.g. to press a control button to exit the application program 33. Program 200 is entered upon a mouse down event 202. First, program 200 determines if the user is pressing a control button 102, 104, that is if the mouse hot spot coordinates correspond to the display buttons' 102, 104 coordinates, indicating navigational mode use (step 204). The YES path from step 204 advances program execution to step 206 which is a conventional button handler routine and application program execution exits from the program 200 via step 208.

The NO path from step 204 leads to step 210 which also relates to determining if a secondary cursor 108A is required. At step 210 the program determines if application program 33 has called for graphical entry or writing mode and if the current primary cursor 110A is in the graphical entry or writing area 106. The negative path is to step 208 and exit from program 200. The affirmative path moves program execution into what is properly the secondary cursor module 34.

Transition from the display of a primary cursor to a secondary cursor should be transparent to avoid disturbing the user. The term primary cursor refers to a cursor associated with the hot spot of display screen 70. The secondary cursor is a cursor and associated data structure which is detached by the system and method of the invention from the hot spot. All of the data structures required to generate the primary and secondary cursors are handled by the data system and manipulated by secondary cursor module 34 through the mechanism of system calls. At the outset of a graphical operation the secondary cursor replaces the primary cursor at the primary cursor's then current position. Steps 212, 214, 216 and 218 handle the transition. At step 212 the current location of the primary cursor is stored. At step 214, the primary cursor 110A is made "invisible" by issuing a system API call, which in Windows 95/3.x is the call "ShowCursor(fShow)" with the cursor visibility flag set to decrement the cursor show level count to a negative number, which in turn hides the primary cursor. Next, at step 216, the program creates a secondary cursor 108A. The coordinates for the secondary cursor are set to match the coordinates of the primary cursor. At step 218 a Windows 95 system call "SetCursorPos(x,y)" issued to reset the position of the now invisible primary cursor's 110A position, or more exactly the primary cursor hot spot, preferably the center of the display screen.

After the program 200 completes the transition steps, the program is ready to track the user's movement of mouse 80. Exit conditions from the graphical mode are handled first. The secondary cursor module 34 is interrupted by any mouse up event, whenever it occurs. This is reflected by step 220 which is shown occurring after step 218 and indicates transfer of program control out of the module along the NO path to information box 236. The YES path from step 220 indicates advance of execution to step 222 which monitors for a mouse movement message from the operating system/API 31. Until movement is indicated, or a time out occurs, program execution loops back through 220. Once mouse movement is detected the program will receive indication of the new primary cursor position from the device drivers layer 34 through the operating system/API 31. The new position of the primary cursor 110A will define a vector relative to the center coordinates of the screen display 100 (step 226) determined at the basic cursor rate. Next, at step 228, the program retrieves a linear scaler for the user (which generally may be selected by the user) and multiplies the vector by the scale to generate a secondary cursor displacement. At step 230 a position for a new secondary cursor 108A is calculated by determining the coordinates of a point displaced from the current position of the secondary cursor by the secondary cursor displacement vector, subject independently to maximum and minimum limits for the x and y coordinates to prevent the secondary cursor from being moved outside the graphical area 106. At step 232 the appropriate API system calls are made to display the secondary cursor 108A at the newly calculated position. The new position is stored and becomes the new current position for use with a subsequent secondary cursor displacement vector. In the graphics application which is the environment of the preferred embodiment, a line is drawn on the screen display 100 connecting the former secondary cursor position with the current secondary cursor position and stored. The generation of the line is conventional however and forms no part of the invention. At step 234, the primary cursor 110A is reset to the center coordinates of the screen. Reset of the primary cursor position is not treated as a mouse movement event. Reset of the primary cursor position is required after every mouse movement event to prevent the primary mouse position from reaching the limits of the screen display 100, which in turn would prevent further movement of the secondary cursor in a given direction.

After the steps triggered by a mouse movement event, the program returns to the event waiting operation associated with steps 220 and 222. Steps 224 through 234 may be repeated as many times as required to complete the graphical operation being executed by the user. Steps 236–242 provide for an orderly, user-transparent, exit from program 200 and return to mouse navigation mode, as indicated by box 236. At step 238 the primary cursor position is set to equal the current position of the secondary cursor by a "SetCursorPos" call. At step 240 the secondary cursor data structures are destroyed. Next, at step 242 the primary cursor is displayed (i.e. the cursor show-level count is incremented to at least 0). The program is then exited by step 208.

The scaler for an individual is typically set when the user first utilizes a program incorporating the secondary cursor module 34, preferably by providing a scroll bar data input mechanism. The scale is then stored as part of user profile and is called up whenever a user logs onto the system. It will now be obvious to those skilled in the art that the rescale vector step 228 and the secondary cursor display and line drawing step 232 may be modified to produce a variety of secondary cursor behaviors, e.g. movement of the secondary cursor could be set to mirror movement of the mouse rather than track it. In the preferred embodiment the invention allows scaling of cursor response to mouse movement to allow larger motor skills to be exercised and potentially to permit use of the device by people who may have lost use of fine motor skills.

While the invention has been particularly shown and described with reference to a preferred embodiment, it will be understood by those skilled in the art that various changes in form and detail may be made therein without departing from the spirit and scope of the invention.

I claim:

1. In a data processing system having a video display with positions, a hot spot associated with a position on the video display and a user manipulable input device for moving the hot spot from position to position, a method comprising the computer implemented steps of:

(a) defining a subregion with positionally defined borders in the video display;

(b) displaying an icon for a primary cursor associated with the hot spot on the video display;

(c) opening the subregion for graphical insertions by a user;

(d) responsive to user movement of the hot spot into the subregion, hiding the primary cursor and imaging a secondary cursor in the position of the hot spot;

(e) saving the position of the hot spot;

(f) resetting the hot spot to a base position;

(g) responsive to manipulation of the input device, determining a movement vector of the hot spot from the base position;

(h) responsive to the movement vector, calculating a secondary cursor movement vector; and (i) repositioning the secondary cursor using the secondary movement vector.

2. The method of claim 1, further comprising the computer implemented step of:

responsive to user request, repeating steps (f) through (i).

3. The method of claim 1, further comprising the computer implemented step of:

(j) imaging a line on the display device connecting successive positions of the secondary cursor.

4. The method of claim 3, further comprising the computer implemented step of:

responsive to user request, repeating steps (f) through (j).

5. The method of claim 4, wherein the user manipulable input device is a computer mouse and further wherein execution of steps (d) through (j) are responsive to the initiating and maintaining a mouse down condition.

6. The method of claim 5, further comprising the computer implemented step of:

(k) responsive to a mouse up condition,
  (1) setting the hot spot to the position of the secondary cursor,
  (2) destroying the secondary cursor,
  (3) imaging an icon for a primary cursor.

7. The method of claim 6, wherein step (i) further comprises:

limiting repositioning of the secondary cursor to the borders of the region.

8. The method of claim 7, wherein step (h) includes calculating the secondary cursor movement vector responsive to an individual user parameter.

9. A data processing system comprising:

a user interface shell having a hot spot;

an image generator for imaging the user interface shell, defining coordinates on the user interface shell and for imaging icons in the shell;

a cursor positioning device coupled to the data processing system to supply coordinate data events relative to the shell for moving a hot spot in the shell;

driver means for automatically positioning an icon for a primary cursor with the hot spot;

means responsive to a user initiated condition for generating an icon for a secondary cursor at the hot spot and thereafter hiding the primary cursor and resetting the hot spot to a base set of coordinates in the shell; and means responsive to the cursor positioning device for repositioning the secondary cursor at a new secondary cursor position starting from a current secondary cursor position and based upon a vector defined by movement of the hot spot.

10. A data processing system as set forth in claim 9, wherein the means for repositioning includes:

means for resetting the hot spot to the base set of coordinates after each coordinate data event.

11. A data processing system as set forth in claim 10, wherein the vector defined by movement of the hot spot is scaled by a user selectable multiplier before use in determining the new secondary cursor position.

12. A data processing system as set forth in claim 11, and further comprising:

means responsive to repositioning of the secondary cursor for imaging a line connecting the current secondary cursor position with the new secondary cursor position.

13. In a data processing system having a bounded user interface shell defining positions for user entry of commands and data, a hot spot associated with a position in the user interface shell and a hot spot positioning device, a method comprising the computer implemented steps of:

imaging an icon with the hot spot;

responsive to entry to a graphical mode operation, detaching the icon from the hot spot;

responsive to movement events received from the hot spot positioning device, generating successive new positions for the icon starting from the then current positions of the icon and displaced from the current positions by scaled vectors derived from positioning information from the hot spot positioning device; and resetting the position of the hot spot to avoid the bounds of the bounded user interface shell.

14. The method of claim 13, further comprising the computer implemented steps of:

resetting the position of the hot spot to a base position after every movement event.

15. The method of claim 14, further comprising the computer implemented step of:

responsive to a user command to exit the graphical mode operation,
  setting the hot spot to the then current location of the icon, and
  reattaching the icon to the hot spot for movement.

16. The method of claim 15, further comprising the computer implemented step of:

limiting repositioning of the icon within a graphical mode operation area.

* * * * *